United States Patent
Calton et al.

(10) Patent No.: US 10,568,337 B1
(45) Date of Patent: Feb. 25, 2020

(54) METHOD AND COMPOSITION FOR PROVIDING LIQUID COCONUT OIL

(71) Applicants: Jayson Calton, North Venice, FL (US); Mira Calton, North Venice, FL (US)

(72) Inventors: Jayson Calton, North Venice, FL (US); Mira Calton, North Venice, FL (US)

(*) Notice: Subject to any disclaimer, the term of this patent is extended or adjusted under 35 U.S.C. 154(b) by 0 days.

(21) Appl. No.: 16/262,436

(22) Filed: Jan. 30, 2019

Related U.S. Application Data

(63) Continuation of application No. 14/266,155, filed on Apr. 30, 2014, now abandoned.

(51) Int. Cl.
| | |
|---|---|
| A23F 5/40 | (2006.01) |
| A23F 5/46 | (2006.01) |
| A23F 3/00 | (2006.01) |
| A23D 9/04 | (2006.01) |

(52) U.S. Cl.
CPC ..................... *A23D 9/04* (2013.01)

(58) Field of Classification Search
None
See application file for complete search history.

(56) References Cited

U.S. PATENT DOCUMENTS 5,221,668 A * 6/1993 Henningfield ....... A61K 38/018
424/439

2009/0011077 A1 * 1/2009 Schiffrin ............. A23L 1/296
426/2
2013/0017278 A1 * 1/2013 Keller ............... A61K 36/889
424/727

OTHER PUBLICATIONS

LouAna® Liquid Coconut sheet, http://www.louana.com/product-detail.aspx?productID=107&catID=44&pcatID=37, copyright 2016, p. 1.*

* cited by examiner

*Primary Examiner* — Tamra L. Dicus
(74) *Attorney, Agent, or Firm* — Malin Haley DiMaggio & Bowen, P.A.

(57) ABSTRACT

A method of maintaining the liquidity of coconut oil (i.e. organic virgin) at room temperature (76° F.) and below, while reducing the coconut taste, and significantly increasing the fat burning/ketone producing property by combining coconut oil (i.e. organic virgin) with medium chain triglycerides (MCT) in predetermined specific ratios, that includes the step of heating the coconut oil to a prescribed temperature for approximately 24 hours (or until liquidity is achieved) and then mixing the liquefied coconut oil with a specified ratio of MCT oil. The resultant composition is a neutral tasting, fat burning/ketone producing oil that remains a liquid at room temperature 76° F. (and below) for use in cooking and foodstuffs such as a salad dressing. In an alternate embodiment, an additional amount of olive oil (i.e. organic extra-virgin) or an omega-3 based oil can be added to further reduce the coconut flavor and enhance the health benefits of the composition.

12 Claims, No Drawings

METHOD AND COMPOSITION FOR PROVIDING LIQUID COCONUT OIL

CROSS REFERENCE TO RELATED APPLICATIONS

This application is a continuation of U.S. patent application Ser. No. 14/266,155 filed on Apr. 30, 2014

BACKGROUND OF THE INVENTION

Field of the Invention

A method of maintaining the liquidity of coconut oil (i.e. organic virgin) at room temperature (76° F.) and below, while reducing the inherent coconut taste, and significantly increasing the fat burning/ketone producing property by combining organic virgin coconut oil with medium chain triglycerides (MCT) in predetermined specific ratios, for use in food products such as mayonnaise, and salad dressings, and for use in cooking. In other embodiments olive oil (i.e. organic extra-virgin) or omega-3 based oils (i.e. fish or flax) can also be added for additional flavor profiles and health benefits.

Description of Related Art

Millions of people around the world are now looking for alternatives to undesirable, highly processed genetically modified (GMO) vegetable oils such as corn oil (GMO) and soybean oil (GMO) and canola oil (GMO) that are currently being used in heavily consumed food products that include mayonnaise and salad dressings. Additionally, millions of people around the world are looking for a natural way to improve their health, burn fat, increase metabolism and/or improve their insulin sensitivity and glucose tolerance.

Coconut oil (i.e. organic virgin) has been scientifically proven to be heart healthy, cholesterol normalizing, thyroid boosting, and have antibacterial, antiviral, and antiprotozoal properties.

The problem however when using coconut oil (i.e. organic virgin) as a food product or with other food products is that coconut oil is solid at room temperature (76° F.) making coconut oil hard to work with in the kitchen when a liquid oil is need for things like salad dressings or marinades.

Another problem with coconut oil (i.e. organic virgin) is that when coconut oil is used directly in other foods, the coconut oil has a strong, often overpowering, coconut flavor making most foodstuffs that are prepared using coconut oil taste like coconuts, often changing the intended flavor of the dish.

Because of these undesirable characteristics in using coconut oil (i.e. organic virgin) for inclusion in foodstuffs and cooking, the tremendous health and nutritional benefits of coconut oil as food product for human health is under-utilized.

Medium chain triglycerides (MCT) are specialized fats that are naturally found in coconut oil. MCT oil contains only medium chain triglycerides that have been naturally extracted from coconut oil. It has been found that it is difficult for the human body to store MCT oil as body fat. Published research shows that MCTs are different from other fats in that instead of being stored as body fat, MCTs increase metabolism, reduce body fat, and improve insulin sensitivity and glucose tolerance, all of which are beneficial to human health.

There are two main problems however with the consumption of MCT oil, which makes its usage outside of athletic or scientific environments unpopular.

First, when consumed by itself, MCT oil has been known to cause an upset stomach. However, this use restrictive trait dissipates nearly entirely when MCT is added to coconut oil.

Second, MCTs are digested differently from other fats in that they are converted to ketones in the liver, and do not contain the long chain fatty acids needed to stimulate the release of bile acid required for the absorption of fat-soluble vitamins, such as vitamins A, D, E and K, from food. This second restrictive trait is again overcome when MCT oil is combined with coconut oil, which does contain the necessary long chain fatty acids required to stimulate the release of bile acid.

While olive oil (i.e. organic extra-virgin) is considered a heart healthy fat by the medical community at large due to the fact that it is comprised of monounsaturated fatty acids (MUFAs), it to has a problem. Olive oil (i.e. organic extra virgin) contains a high amount of the essential fatty acid omega-6, which is known in the medical and scientific worlds to cause inflammation, which can lead to disease. Doctors and nutritionists recommend reducing omega-6 levels and increasing omega-3 levels to nearly equal ratios—3:1-1:1 respectfully. Yet, around the world the ratios of omega 6 to omega 3 are much higher—as high as 25:1 in the US. The use of olive oil adds to the high ratio of omega 6 to omega 3 in the general population.

In an alternative embodiment the invention described herein provides a method and composition to mix olive oil with Applicant's liquid coconut oil invention to receive the benefits of olive oil (MUFAs) while reducing the levels of omega-6 by 85% compared to traditional olive oil.

The invention described herein for providing liquid coconut oil combines the benefits of coconut oil (i.e. organic virgin) and MCT oil in specifically prescribed ratios to overcome the problems described above with respect to coconut oil and MCT oil individually that have previously made each of them undesirable for human use in food products.

In some embodiments the invention can also include blending the coconut oil/MCT oil composition (i.e. liquid coconut oil) with olive oil (i.e. organic extra-virgin) or an omega-3 based oil in order to change the flavor profiles and increase the nutritional value/health benefits of the food product described herein, by reducing the Omega-6 levels in the composition. One goal of the invention is to create a liquid coconut oil that can be used in a temperature range, at room temperature to refrigeration temperatures, with cold foods and beverage applications and that has the benefits of both medium chain fats (MCTs)(fat burning/ketone producing) and long chain fats (fat-soluble vitamin absorption), while reducing Omega-6 levels compared to other kitchen oils for heart health. The invention is useful in food preparation as a liquid with especially cold foods or beverages such as frozen desserts, yogurt, refrigerated salad dressings, cold smoothies, or beverages.

SUMMARY OF THE INVENTION

A coconut oil (i.e. organic virgin) based food product composition that maintains liquidity at room temperature and below, and has a neutral (light to non-coconut) taste profile making the composition easy to use in recipes like traditional oils, and has the combined nutritional health benefits of coconut oil (i.e. organic virgin) and MCT oil, including significant fat burning/ketone producing properties.

The process to maintain the liquidity the coconut oil (i.e. organic virgin) at room temperature (76° F.) and below, reduce the coconut taste, and significantly increase fat burning/ketone producing properties is performed as follows. A predetermined volume of coconut oil (i.e. organic virgin) is placed in a container and the temperature is raised to between 80° F. and 89° F. for about 24 hours. This creates a fully liquid coconut oil (i.e. organic virgin). The fully liquefied coconut oil is then combined with an already liquid medium chain triglycerides (MCT) oil in a specific predetermined ratio. The two oils are then mixed and placed in a container such as a bottle for use. The mixture ratio would include by volume a larger amount of MCT oil and a smaller amount of coconut oil (i.e. organic virgin). The volume ratios for the mixture can vary from 5:3 up to 10:1 of MCT oil by volume to coconut oil (i.e. organic virgin). Once this mixture of coconut oil (i.e. organic virgin) and MCT in a specific ratio is achieved, the resulting composition is an oil that will maintain its liquidity at room temperature and that can be refrigerated and still remain in a liquid state. The resulting food product provides a healthy, neutral tasting and fat burning/ketone producing oil that can be used in salad dressings and other food applications in a liquid state.

In some embodiments olive oil (i.e. organic extra-virgin) can be added for its nutritional value and flavor. The olive oil is added to the coconut oil (i.e. organic virgin) and MCT blend previously created as described above. Again there is a specified ratio between the three oils to achieve the desired results. As an example by volume the same amount of olive oil that was used for the volume of coconut oil would constitute part of the ratio of the blend of all three oils. This results in an oil blend that delivers olive oil's desired taste and health benefits, while greatly reducing the inflammation causing omega-6 levels when compared to traditional olive oil. The ratio of olive oil to the coconut oil/MCT oil by volume mixture in an example would be 5 MCT oil/3 coconut oil/3 olive oil. This ratio could also be 10 MCT oil/1 coconut oil/1 olive oil.

In another embodiment an omega-3 based oil (i.e. fish or flax) can be added for its nutritional value. The omega-3 based oil is added to the organic virgin coconut oil and MCT blend previously described above. Again there is a specified ratio between the three oils to achieve the desired results. As an example by volume the same amount of omega-3 based oil that was used for the volume of coconut oil would constitute part of the ratio of the blend of all three oils.

It is an objective of this invention to provide a process to maintain the liquidity of coconut oil (i.e. organic virgin) at room temperature (76° F.) and below so that it can easily be used in preparing popular food items where a liquid oil is called for such as salad dressings.

It is another objective of this invention that the liquid coconut oil should have a greatly reduced coconut flavor and have increased fat burning/ketone producing properties compared to traditional coconut oil.

It is another objective of this invention to provide the use of coconut oil (i.e. organic virgin) in conjunction with medium chain triglycerides (MCT) in a liquefied state for use in the preparation and consumption of food products for its health benefits.

And yet another object of this invention is to provide the use of coconut oil (i.e. organic virgin) in conjunction with MCT oil in a liquefied state and with olive oil to reduce Omega-6 levels.

PREFERRED EMBODIMENT OF THE INVENTION

A method and composition to liquefy and to maintain the liquidity of coconut oil (i.e. organic virgin) at room temperature (76° F.) or below, to reduce its overpowering coconut taste, and to increase its fat burning/ketone producing properties. The method includes the steps of placing a desired amount of the coconut oil (i.e. organic virgin) in a container that is heated to a temperature of 80 F to 89° F. continuously for 24 hours (or until completely liquefied). At that time and in the preferred embodiment, medium chain triglycerides (MCT) oil is added to the liquefied coconut oil in a ratio of volume five (5) parts MCT oil to one (1) part coconut oil by volume. The coconut oil (i.e. organic virgin) and MCT oil are mixed thoroughly and the resulting composition is then put in a container such as a bottle for use in food preparation. As an example of use, the composition can be poured from the bottle directly onto a salad as a salad dressing, which may also include other spices, which can be directly consumed by the user.

In an alternate embodiment the method and composition liquid coconut oil (i.e. organic virgin) and MCT oil mixture could also receive one part olive oil (i.e. organic extra-virgin) by volume making the ratio of MCT oil:to coconut oil:to olive oil 5:1:1 by volume. The advantage of this embodiment is that the addition of the olive oil further reduces the coconut tastes and adds the flavor of the olive oil and additional health and nutritional benefits to the coconut oil and MCT oil mixture (i.e. liquid coconut oil), while reducing the level of omega-6 fatty acids by 85% compared to traditional olive oil (in the 5:1:1 ratio). As an example of use, the composition described can be used on bread for nutritional value and flavoring in lieu of traditional olive oil, butter or margarine.

In another embodiment the method and composition liquid coconut oil (i.e. organic virgin) and MCT oil mixture (i.e. liquid coconut oil) could also receive one part omega-3 based oil (such as fish or flax) by volume making the ratio of MCT oil to organic virgin coconut oil to omega-3 based oil 5:1:1 by volume. The advantage of this embodiment is that the addition of the omega-3 based oil further reduces the coconut taste, while it adds unique essential fatty acids not found in coconut or MCT oil providing additional health and nutritional benefits to the coconut oil and MCT oil mixture. As an example of use, the composition described can be used in lieu of taking fish or flax oil.

While the ratios discussed above are very desirable, it is believed that the ratios can be varied from approximately 5:3 parts by volume of MCT oil to coconut oil (i.e. organic virgin) up to as high as 10:1 parts by volume of MCT oil to coconut oil (i.e. organic virgin). When using the alternate embodiment that includes olive oil (i.e. organic extra-virgin) or an omega-3 based oil, the volume of olive oil or omega-3 based oil used could be the same volume as that of the coconut oil (i.e. organic virgin) (5:1:1) or could increase to as high as five (5) parts by volume (5:1:5) or be reduced to as little as a half (½) part by volume (5:1:½).

The invention described herein for liquefying coconut oil with MCT oils and its resulting uses is a combination of coconut oil (i.e. organic virgin) combined with MCT oil, and in some embodiments olive oil or an omega-3 based oil, which greatly expands the desirable use of coconut oil, an oil scientifically proven to have health enhancing properties. Because of the present invention, the ability of millions of people to receive the health benefits of coconut oil will be greatly enhanced and its desirability for use increased because of its unique ability to maintain liquidity at room temperature and below and because of its greatly reduced coconut taste, making the composition much easier to work with based on the present invention, as well as the composition's increased fat burning/ketone producing properties.

The instant invention has been shown and described herein in what is considered to be the most practical and preferred embodiment. It is recognized, however, that departures may be made therefrom within the scope of the invention and that obvious modifications will occur to a person skilled in the art.

What we claim is:

1. A method of maintaining the liquidity of coconut oil continuously in a temperature range from a temperature of 76° F. or less reducing the coconut taste and increasing the fat burning/ketone producing properties, for use in food stuffs comprising the steps of:
    a) placing a quantity of coconut oil in a container suitable for heating the coconut oil contained therein;
    b) heating the container and the coconut oil at a temperature of 80° F. to 89° F. until liquefied;
    c) adding a specified quantity of medium-chain triglycerides (MCT) oil to the liquefied coconut oil in said container in a particular ratio between the MCT oil by volume and coconut oil by volume; said MCT oil mixed with the coconut oil in ratios between 5:3 and 10:1 by volume MCT oil to coconut oil;
    d) mixing the MCT oil and the liquefied coconut oil until the mixture is thoroughly combined; and
    e) removing the resultant MCT oil and coconut oil mixture from the container and placing the mixture in a separate container for use in food stuffs between temperature of 76° F. or less, whereby said resultant MCT oil and coconut oil mixture remains a liquid between the temperature 76 degrees F. or less, maintaining liquidity during refrigeration.

2. A process as in claim 1, including the step of:
    adding olive oil in the same ratio as coconut oil with the MCT oil to further reduce the coconut taste and enhance the health benefits.

3. A method as in claim 1, including:
    adding an Omega 3-based oil in the same ratio as coconut oil with the MCT oil to further reduce the coconut taste and enhance the health benefits.

4. A method as in claim 1, including the step of: using organic virgin coconut oil.

5. A method of maintaining the liquidity of coconut oil at a temperature of 76° F. or less, maintaining liquidity during refrigeration, reducing the coconut taste and increasing the fat burning/ketone producing properties, for use in food stuffs and cooking comprising the steps of:
    a) heating a quantity of coconut oil;
    b) heating the quantity of coconut oil at a temperature of at least 80° F. until the coconut oil is liquefied;
    c) adding a specific quantity of medium-chain triglycerides (MCT) oil to the liquefied coconut oil in a particular ratio between the MCT oil by volume and the coconut oil by volume; said MCT oil being mixed with the coconut oil in the ratios of 5:3 and 10:1 by volume MCT oil to coconut oil;
    d) mixing the MCT oil and the liquefied coconut oil until the mixture is thoroughly combined; and using the resultant MCT oil and coconut oil liquid mixture in cooking or food stuffs;
    whereby the MCT oil and the coconut oil liquefied mixture will maintain its liquidity continuously between 76° F. or less, including during refrigeration for use with and in foods.

6. A method in claim 5, including the step of: using organic virgin coconut oil.

7. A method as in claim 5, including the step of:
    adding olive oil in the same ratio as coconut oil with the MCT oil to further reduce the coconut taste and enhance the health benefits.

8. A method as in claim 5, including the step of:
    adding Omega-3 based oil in the same ratio as coconut oil with the MCT oil to further reduce the coconut taste and enhance the health benefits.

9. A method to liquefy coconut oil to gain the health benefits for use in enhancing food nutrition for use continuously as a liquid in temperature ranges between 76° F. or less, maintaining liquidity during refrigeration, in and on foods comprising the steps of:
    a) providing a quantity of coconut oil in a heating container;
    b) heating the heating container and the coconut oil contained therein above at least a temperature of 80° F. until the coconut oil is liquefied;
    c) adding a specified quantity of medium-chain triglycerides (MCT) oil to the liquefied coconut oil in said heating container in a ratio of between 5:3 and 10:1 between the MCT by volume and coconut oil by volume;
    d) mixing the MCT oil and the liquefied coconut oil until the mixture is thoroughly combined as a liquid; and
    e) removing the resultant MCT oil coconut oil liquid mixture from the heating container and placing the liquid mixture in a separate storage container for continuous use in cooking and with cold food stuffs as a liquid, said mixture of MCT oil and coconut oil maintaining its liquidity continuously between 76° F. or less, including during refrigeration.

10. A method as in claim 9, including the step of:
    adding olive oil in the same ratio as coconut oil with the MCT oil to further reduce the coconut taste and enhance the health benefits.

11. A method as in claim 9, including the step of:
    adding Omega-3 based oil in the same ratio as coconut oil with the MCT oil to further reduce the coconut taste and enhance the health benefits.

12. A method as in claim 9, including the step of: using organic virgin coconut oil.

* * * * *